United States Patent [19]
Gulotta et al.

[11] Patent Number: 5,385,872
[45] Date of Patent: Jan. 31, 1995

[54] ULTRAVIOLET ABSORBING GREEN TINTED GLASS

[75] Inventors: Joseph A. Gulotta, New Kensington; Larry J. Shelestak, Bairdford, both of Pa.

[73] Assignee: PPG Industries, Inc., Pittsburgh, Pa.

[21] Appl. No.: 857,903

[22] Filed: Mar. 26, 1992

Related U.S. Application Data

[63] Continuation-in-part of Ser. No. 559,915, Jul. 30, 1990, Pat. No. 5,240,886.

[51] Int. Cl.$^6$ .............................................. C03C 3/087
[52] U.S. Cl. ....................................................... 501/71
[58] Field of Search ................................ 501/69, 70, 71

[56] References Cited

U.S. PATENT DOCUMENTS

| | | | |
|---|---|---|---|
| 1,726,635 | 9/1929 | Taylor . | |
| 2,524,719 | 10/1950 | Tillyer | 106/52 |
| 2,582,453 | 1/1952 | Pincus | 106/52 |
| 2,655,452 | 10/1953 | Barnes et al. | 106/52 |
| 2,860,059 | 11/1958 | Molter et al. | 106/52 |
| 3,294,556 | 12/1966 | Harrington | 106/52 |
| 3,300,323 | 1/1967 | Plumat et al. | 106/52 |
| 3,359,125 | 12/1967 | Bishop | 106/54 |
| 3,967,040 | 6/1976 | Plumat et al. | 428/410 |
| 4,792,536 | 12/1988 | Pecoraro et al. | 501/70 |
| 5,077,133 | 12/1991 | Cheng | 428/426 |
| 5,234,871 | 8/1993 | Krashkevich | 501/73 |

FOREIGN PATENT DOCUMENTS

| | | |
|---|---|---|
| 596334 | 1/1990 | Australia . |
| 0488110A1 | 6/1992 | European Pat. Off. . |
| 0507985A1 | 10/1992 | European Pat. Off. . |
| 0527487A1 | 2/1993 | European Pat. Off. . |
| 0555552A1 | 8/1993 | European Pat. Off. . |
| 411702C1 | 10/1992 | Germany . |
| 4111702C1 | 10/1992 | Germany . |
| WO91/07356 | 5/1991 | WIPO . |
| WO91/11402 | 8/1991 | WIPO . |

OTHER PUBLICATIONS

Glass Colors, V: Examples of the Composition of Colored Glasses, Jiri Kocik, Jiri Nebrensky and Ivan Fanderlik, Fachberichte, Sprechsaal, vol. 121, No. 1, 1988, 42–44, No month.

*Primary Examiner*—Karl Group
*Assistant Examiner*—A. Wright
*Attorney, Agent, or Firm*—Andrew C. Siminerio

[57] ABSTRACT

A green tinted, ultraviolet absorbing glass is disclosed having a standard soda-lime-silica base glass composition and a colorant portion consisting essentially of on a weight basis: less than 2.0% total $CeO_2$, $V_2O_5$, $TiO_2$ or $MoO_3$ and greater than 0.7% total iron (expressed as $Fe_2O_3$) with the ratio of FeO/total iron less than 0.35.

The glass reduces the amount of costly cerium required to yield low ultraviolet transmittance, viz., no greater than 31 percent (300 to 390 nanometers) at a reference thickness of 3.9 millimeters.

12 Claims, No Drawings

ULTRAVIOLET ABSORBING GREEN TINTED GLASS

This application is a continuation-in-part application of U.S. Ser. No. 07/559,915, filed Jul. 30, 1990, now U.S. Pat. No. 5,240,886.

BACKGROUND OF THE INVENTION

This invention relates to soda-lime-silica glass particularly suitable for controlling transmittance of solar radiation in window glazing applications. The glass may be generally described as being green tinted, and is designed to have low heat transmittance and particularly enhanced absorption in the ultraviolet wavelength range. This is desirable for the sake of reducing the rate at which the sun's rays deteriorate plastics and fabrics in applications such as automobiles. A particular objective of the invention is to permit glass of this type to be made at a lower cost by reducing the amount of costly ingredients required. Soda-lime-silica flat glass may be essentially characterized by the following composition on a weight percentage basis of the total glass:

|  |  |
|---|---|
| $SiO_2$ | 66–75% |
| $Na_2O$ | 10–20 |
| $CaO$ | 5–15 |
| $MgO$ | 0–5 |
| $Al_2O_3$ | 0–5 |
| $K_2O$ | 0–5 |

Other minor ingredients, including melting and refining aids such as $SO_3$, may also appear in the glass composition. Small amounts of $K_2O$, $BaO$ or $B_2O_3$ and other minor constituents have also sometimes been included in flat glass and may be considered optional. To this base glass are added the coloring constituents that produce the transmittance properties of the glass. The primary colorant in the category of glasses relevant to the present invention is iron, which is usually present in both the $Fe_2O_3$ and FeO forms. As is conventional, the total amount of iron present in a glass is expressed herein as $Fe_2O_3$, regardless of the form actually present. A typical green tinted automotive glass has about 0.5 percent by weight total iron, with the ratio of FeO to total iron being about 0.25.

Larger amounts of iron have been used in some specialty glasses intended to lower the total solar energy transmittance. However, merely increasing the amount of total iron does not reduce the ultraviolet transmittance to the extent desired even when the amount of iron present is sufficient to lower the luminous (visible light) transmittance to the minimum acceptable for automotive applications under conventional commercial melting conditions. The colorant composition and transmittance properties for examples of two commercial products of this high iron, dark green tinted type along with an example of the conventional, light green tinted glass described above are set forth below:

|  | Light Green Example A | Dark Green Example B | Dark Green Example C |
|---|---|---|---|
| Total Iron (wt. %) | 0.550 | 0.805 | 0.720 |
| FeO/Tot. Iron | 0.251 | 0.293 | 0.270 |
| $LT_A$ (%) | 79.5 | 70.9 | 71.6 |
| TSUV (%) | 48.1 | 36.9 | 36.5 |
| TSIR (%) | 36.7 | 22.9 | 29.2 |
| TSET (%) | 56.8 | 44.6 | 48.8 |

The transmittance data in the table above and throughout are based on a glass thickness of 3.9 millimeters (0.154 inch). Luminous transmittance (LTA) is measured using C.I.E. standard illuminant "A" over the wavelength range 380 to 770 nanometers. Total solar ultraviolet transmittance (TSUV) is measured over the wavelength range 300 to 390 nanometers. Total solar infrared transmittance (TSIR) is measured over the wavelength range 800 to 2100 nanometers. Total solar energy transmittance (TSET) represents a computed value based on measured transmittances from 300 to 2100 nanometers at 50 nanometer intervals.

Recently, a goal has been established to limit ultraviolet transmittance to no more than 31 percent in some automotive glass. At the same time, it is a requirement that glass in vision areas of automobiles have an LTA of at least 70 percent. Simply increasing the amount of iron to lower the ultraviolet transmittance would impermissibly lower the luminous transmittance as well, so an alternative approach is needed. The use of cerium oxide in glass to reduce ultraviolet transmittance is disclosed in U.S. Pat. No. 2,860,059, and the following two examples are of commercial products that take this approach:

|  | Example D | Example E |
|---|---|---|
| $CeO_2$ (wt. %) | 1.06 | 0.70 |
| Total Iron (wt. %) | 0.780 | 0.858 |
| FeO/Tot. Iron | 0.290 | 0.282 |
| $LT_A$ (%) | 71.4 | 70.4 |
| TSUV (%) | 27.8 | 28.3 |
| TSIR (%) | 22.8 | 20.6 |
| TSET (%) | 44.6 | 42.9 |

These glasses exhibit the desired combination of low ultraviolet transmittance and high luminous transmittance, but the high cost of cerium sources substantially increases the cost of making these glasses. It would be desirable if these objectives could be met without incurring such high raw material costs. High cerium content also produces an undesirable solarization effect, that is, the glass tends to darken upon exposure to ultraviolet radiation. For these reasons, it would be desirable to lower the amount of cerium required in this type of glass.

SUMMARY OF THE INVENTION

An objective of the present invention is to provide green tinted glass that has luminous transmittance of at least 70 percent and ultraviolet transmittance of no more than 31 percent (both transmittances at a reference thickness of 3.9 millimeters), without requiring the use of as much costly cerium oxide as in prior compositions of this type. These properties may be achieved by the present invention with less than 0.5 percent by weight $CeO_2$ in the glass, preferably less than 0.4 percent by weight $CeO_2$. The optimized embodiments of the present invention contain less than 0.35 percent by weight $CeO_2$. Other materials, such as vanadium, titanium and/or molybdenum may be used in place of or in combination with cerium to achieve the desired reduction in ultraviolet transmittance. Compared to competing glasses, the glasses of the present invention are characterized by larger amounts of total iron and smaller proportions of the iron in the ferrous state. The total iron (expressed as $Fe_2O_3$) is greater than 0.70 percent by weight of the total glass composition, and the ratio of FeO/total iron (ferrous iron expressed as FeO divided by the total iron expressed as $Fe_2O_3$) is less than 0.350.

DETAILED DESCRIPTION

The base glass composition is not critical to the present invention and may consist of any conventional soda-lime-silica flat glass composition, which may be characterized by the ranges set forth above. Preferably, the base glass is one known by those of skill in the art to be producible in a continuous melting furnace and formed into a flat sheet by the float process. A specific example of a glass of the present invention can be seen in Example 1.

|  | Example 1 |
| --- | --- |
| $SiO_2$ | 71.88 percent by weight |
| $Na_2O$ | 13.47 |
| CaO | 8.91 |
| MgO | 3.66 |
| $Al_2O_3$ | 0.27 |
| $K_2O$ | 0.08 |
| $SO_3$ | 0.15 |
| $Fe_2O_3$ (total) | 0.898 |
| $CeO_2$ | 0.28 |

Additionally, traces of impurities may be present without significant effect on the glass. Melting and fining aids such as $SO_3$ are useful during production of the glass, but their residual amounts in the glass can vary and have no significant effect on the properties of the glass product. $K_2O$ is present in this example as an impurity, and its presence is not required, although it serves a function in the glass essentially equivalent to that of $Na_2O$. The ratio of ferrous iron (expressed as FeO) to total iron (expressed as $Fe_2O_3$) for Example 1 was 0.245. The batch mixture of raw materials from which the glass of Example 1 was melted was as follows:

| Sand | 1000 parts by weight |
| --- | --- |
| Soda ash | 324 |
| Limestone | 34 |
| Dolomite | 242 |
| Salt cake | 5 |
| Rouge | 12.32 |
| Cerium carbonate (hydrate) | 5.75 |
| Coal | 1.55 |

The glass of Example 1 exhibited the following transmittance properties at a thickness of 3.9 millimeters:

| $LT_A$ | 70.8% |
| --- | --- |
| TSUV | 29.6% |
| TSIR | 22.1% |
| TSET | 43.7% |

One of the ways to control the ratio of ferrous to total iron is by selecting the amount of coal or other reducing agent included in the batch mixture. Instead of coal, various other sources of carbon are known to serve as reducing agents during melting of glass. Another means of control is by way of the ratio of air to fuel in the melting furnace. A higher air to fuel ratio produces conditions in the melting furnace that are more oxidizing, which, in turn, leads to a lower ferrous to total iron ratio. Specifying the oxidizing control measures depends upon the particular operating characteristics of a particular melting furnace. In Example 1, oxidizing conditions during melting were exceptionally high, so the amount of coal included in the batch was larger than would be desired under other conditions. In some cases it may be desirable to include no coal or other reducing agent in order to attain the oxidizing conditions required for the present invention.

High melting temperatures also tend to have a reducing effect on the glass, as can be seen in the relatively high ferrous to total iron ratios of Examples D and E of the prior art, which indicates that those glasses probably required exceptionally high temperature melting conditions. Because of the low infrared transmittance of the category of dark green tinted, high iron containing glasses to which the present invention pertains, relatively high melting temperatures are to be expected. As a result, making the conditions more oxidizing in accordance with the present invention may yield ferrous to total iron ratios that are relatively low for dark green glass, but not substantially different from those for lightly tinted or clear glass. Therefore, the requirement of a ferrous to total iron ratio less than 0.26 in the present invention is relatively low for this type of glass.

Examples 2 through 7 are additional embodiments of the present invention. Only the colorant portion of the compositions are set forth because the base glass portions vary only slightly.

|  | Example 2 | Example 3 | Example 4 | Example 5 | Example 6 | Example 7 |
| --- | --- | --- | --- | --- | --- | --- |
| $LT_A$ | 70.5 | 70.3 | 70.4 | 70.9 | 70.2 | 71.0 |
| TSUV | 28.4 | 26.6 | 26.4 | 31.0 | 29.9 | 30.2 |
| TSIR | 23.9 | 23.3 | 25.1 | 20.9 | 20.1 | 21.5 |
| TSET | 44.3 | 43.9 | 44.9 | 43.4 | 42.6 | 43.7 |
| $Fe_2O_3$ (total) | 0.957 | 0.973 | 1.132 | 0.882 | 0.907 | 0.896 |
| $FeO/Fe_2O_3$ | 0.222 | 0.222 | 0.161 | 0.261 | 0.254 | 0.243 |
| $CeO_2$ | 0.27 | 0.28 | <0.01 | 0.29 | 0.31 | 0.31 |

Minimizing the amount of cerium oxide used is best for meeting the objectives of reducing the cost of the glass and avoiding solarization, and Example 4 is an embodiment within the scope of the invention in which no cerium was used. However, the very low ferrous to total iron ratio required when no cerium is used may be difficult to attain in some melting furnaces. Therefore, it is preferred that a small amount of cerium be used to yield the desired reduction in ultraviolet transmittance without requiring an unduly low ferrous to total iron ratio. Additionally, cerium oxide is itself an oxidizing agent whose presence assists in attaining the required ferrous to total iron ratio. Accordingly, the preferred embodiments disclosed above include 0.20 to 0.35 percent by weight $CeO_2$ although some commercially operating furnaces may require up to 0.4 percent or more.

The ultraviolet transmittance herein has been reported with reference to the wavelength range 300 to 390 nanometers. Others may use the range 300 to 400 nanometers for measuring ultraviolet. The goal of a maximum ultraviolet transmittance of 31 percent for the present invention would be approximately equivalent to 38 percent if the range 300 to 400 nanometers is used.

Cerium is sometimes included in glass to "decolorize" the glass. But the glass of the present invention has a distinctly green color. The color may be a matter of taste, and the specific color characteristics need not be considered critical to the present invention, but the glasses that have been made in accordance with the invention have been characterized by excitation purity greater than 1 percent, usually from 2 to 4 percent, and dominant wavelength from 495 to 535 nanometers.

Although in the particular embodiment of the invention disclosed above, cerium was used to yield the desired reduction in ultraviolet transmittance, other materials may be used in place of or in combination with the cerium to achieve equivalent results. More specifically, it is believed that vanadium, titanium and molybdenum may be used in the following forms and amounts to reduce ultraviolet transmittance in a manner similar to that discussed earlier with respect to cerium:

| | |
|---|---|
| $V_2O_5$ | <0.2 wt. % |
| $TiO_2$ | <2.0 wt. % |
| $MoO_3 + CeO_2$ | <1.0 wt. % with a minimum of 0.2 wt. $CeO_2$ |

It should be appreciated by those skilled in the art that other forms of these materials, e.g. an elemental form, may be used in the batch composition but will be converted to these oxide forms within the ranges discussed above during the batch melting and refining process.

The total solar energy transmittance (TSET) of the glass of the present invention is relatively low, thereby significantly reducing the amount of thermal energy that passes through a window glazed with the glass. Although not critical to the invention, the TSET of the glasses of the present invention are generally lower than 45 percent.

The invention has been described with reference to specific embodiments, but it should be understood that variations and modifications that are known to those of skill in the art may be resorted to within the scope of the invention as defined by the claims that follow.

We claim:

1. A green tinted, ultraviolet absorbing glass having a base glass composition comprising, on a weight basis, 66–75% $SiO_2$, 10–20% $Na_2O$, 5–15% CaO, 0–5% MgO, 0–5% $Al_2O_3$, 0–5% $K_2O$ and a colorant portion consisting essentially of, on a weight percent basis, iron (expressed as $Fe_2O_3$) in an amount greater than 0.7% with the ratio of FeO/total iron less than 0.35, and oxide selected from a group consisting of $V_2O_5$, $MoO_3$, $CeO_2$, $TiO_2$ and mixtures thereof, wherein said oxide includes at least $V_2O_5$ or $MoO_3$, and said oxide being in sufficient amount but less than 2% to produce glass exhibiting ultraviolet transmittance no greater than 31 percent (300 to 390 nanometers) and luminous transmittance (illuminant A) of at least 70 percent, both at a reference thickness of 3.9 millimeters.

2. A green tinted, ultraviolet absorbing glass having a base glass composition comprising, on a weight basis, 66–75% $SiO_2$, 10–20% $Na_2O$, 5–15% CaO, 0–5% MgO, 0–5% $Al_2O_3$, 0–5% $K_2O$ and a colorant portion consisting essentially of, on a weight percent basis, iron (expressed as $Fe_2O_3$) in an amount greater than 0.7% with the ratio of FeO/total iron less than 0.35, and oxide selected from a group consisting of $V_2O_5$, $MoO_3$, $CeO_2$, $TiO_2$ and mixtures thereof, wherein said oxide includes at least $V_2O_5$ or $MoO_3$, and said oxide being in sufficient amount but less than 2% to produce glass exhibiting ultraviolet transmittance no greater than 31 percent (300 to 390 nanometers) and luminous transmittance (illuminant A) of at least 70 percent, both at a reference thickness of 3.9 millimeters, and exhibiting a dominant wavelength from 495 to 535 nanometers.

3. The glass of claim 1 wherein said colorant portion is less than 0.2 wt. % $V_2O_5$.

4. The glass of claim 1 wherein said colorant portion is less than a total of 1.0 wt. % $MoO_3$ and $CeO_2$, with a minimum of 0.2 wt. % $CeO_2$.

5. The glass of claim 1 wherein the glass exhibits a total solar energy transmittance less than 45 percent at a reference thickness of 3.9 millimeters.

6. A green tinted, ultraviolet absorbing glass having a base glass composition comprising, on a weight basis: 66–75% $SiO_2$, 10–20% $Na_2O$, 5–15% CaO, 0–5% MgO, 0–5% $Al_2O_3$, 0–5% $K_2O$ and a colorant portion consisting essentially of, on a weight percent basis, $CeO_2$ in amount greater than 1.4% but less than 2.0% and greater than 0.7% iron (expressed as $Fe_2O_3$) with the ratio of FeO/total iron less than 0.35, and exhibiting ultraviolet transmittance no greater than 31 percent (300 to 390 nanometers) and luminous transmittance (illuminant A) of at least 70 percent, both at a reference thickness of 3.9 millimeters.

7. The glass as in claim 6 wherein the ratio of FeO/total iron is less than 0.207.

8. The glass as in claim 6 wherein the ratio of FeO/total iron is greater than 0.261 but less than 0.35.

9. The glass of claim 6 wherein the glass exhibits a total solar energy transmittance less than 45 percent at a reference thickness of 3.9 millimeters.

10. The glass of claim 2 wherein said colorant is less than 0.2 wt. % $V_2O_5$.

11. The glass of claim 2 wherein said colorant is less than a total of 1.0 wt. % $MoO_3$ and $CeO_2$, with a minimum of 0.2 wt. % $CeO_2$.

12. The glass of claim 2 wherein the glass exhibits a total solar energy transmittance less than 45 percent at a reference thickness of 3.9 millimeters.

* * * * *

UNITED STATES PATENT AND TRADEMARK OFFICE
CERTIFICATE OF CORRECTION

PATENT NO. : 5,385,872
DATED : January 31, 1995
INVENTOR(S) : Gulotta, et al.

It is certified that error appears in the above-indentified patent and that said Letters Patent is hereby corrected as shown below:

In column 3, line 60, delete "34" and insert --84--.

Signed and Sealed this

Fifth Day of March, 1996

*Attest:*

BRUCE LEHMAN

*Attesting Officer*  *Commissioner of Patents and Trademarks*